(12) United States Patent
Hasegawa

(10) Patent No.: US 12,715,044 B2
(45) Date of Patent: Aug. 25, 2026

(54) INSERT AND CUTTING TOOL

(71) Applicant: KYOCERA CORPORATION, Kyoto (JP)

(72) Inventor: Mitsuru Hasegawa, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 689 days.

(21) Appl. No.: 18/251,397

(22) PCT Filed: Oct. 28, 2021

(86) PCT No.: PCT/JP2021/039811
§ 371 (c)(1),
(2) Date: Nov. 16, 2023

(87) PCT Pub. No.: WO2022/097564
PCT Pub. Date: May 12, 2022

(65) Prior Publication Data

US 2024/0116113 A1 Apr. 11, 2024

(30) Foreign Application Priority Data

Nov. 9, 2020 (JP) ................................ 2020-186482

(51) Int. Cl.
*B23B 27/14* (2006.01)
*B23B 27/10* (2006.01)
*B23B 27/16* (2006.01)

(52) U.S. Cl.
CPC ............ *B23B 27/145* (2013.01); *B23B 27/10* (2013.01); *B23B 27/1611* (2013.01);
(Continued)

(58) Field of Classification Search
CPC ... B23B 27/10; B23B 27/145; B23B 27/1611; B23B 2200/086; B23B 2200/201; B23B 2200/0476; B23B 2250/124
See application file for complete search history.

(56) References Cited

U.S. PATENT DOCUMENTS 4,259,033 A * 3/1981 McCreery ............ B23B 27/145
407/114
4,340,324 A * 7/1982 McCreery ............ B23B 27/145
D15/139
(Continued)

FOREIGN PATENT DOCUMENTS

JP 4275856 B2 6/2009
JP 5843102 B2 1/2016
JP 2016132054 A 7/2016

*Primary Examiner* — Jermie E Cozart
(74) *Attorney, Agent, or Firm* — HAUPTMAN HAM, LLP

(57) ABSTRACT

An insert of the present disclosure includes a first surface, a second surface connecting to the first surface, and a cutting edge located on at least a part of a ridgeline between the first surface and the second surface. The first surface includes, at a position away from the ridgeline, a groove extending from a first end part closest to the cutting edge to a second end part farthest away from the cutting edge. The groove includes an opening located in the first surface, and a bottom surface. The groove includes, at a position closer to the first end part than a half of a groove length, a first groove part where a groove depth increases as going from the second end part toward the first end part, and a second groove part where the groove depth decreases as going from the second end part toward the first end part. The first groove part is located closer to the second end part than the second groove part. A cutting tool of the present disclosure includes the insert.

12 Claims, 13 Drawing Sheets

(52) U.S. Cl.
CPC . *B23B 2200/0476* (2013.01); *B23B 2200/086* (2013.01); *B23B 2200/201* (2013.01); *B23B 2250/124* (2022.01)

(56) References Cited

U.S. PATENT DOCUMENTS 5,203,649 A * 4/1993 Katbi .................... B23B 27/143 D15/139
6,447,218 B1 9/2002 Lagerberg
8,596,935 B2 * 12/2013 Fang ....................... B23B 27/10 408/59
10,232,445 B2 * 3/2019 Ikeda .................... B23B 27/145
2015/0174664 A1 * 6/2015 Nam ..................... B23B 27/145 407/116

* cited by examiner

INSERT AND CUTTING TOOL

CROSS-REFERENCE TO RELATED APPLICATION

This application is a national stage entry according to 35 U.S.C. 371 of PCT Application No. PCT/JP2021/039811 filed on Oct. 28, 2021, which claims priority to Japanese Patent Application No. 2020-186482, filed Nov. 9, 2020. The contents of this application are incorporated herein by reference in their entirety.

TECHNICAL FIELD

The present disclosure may relate to an insert and a cutting tool.

BACKGROUND

Cemented carbide, cermet, and ceramics are materials excellent in heat resistance and wear resistance, and are therefore used as an insert for a cutting tool. The insert is brought into contact with a workpiece at high speeds during use, and the insert is therefore subjected to a temperature rise.

For that reason, the insert and the workpiece are cooled with a coolant during a machining process. In order to enhance cooling effect thus obtained, a plurality of grooves that serve as a flow path for the coolant are provided on a rake surface of the insert in Japanese Patent No. 5843102 (Patent Document 1). A groove provided on an upper surface has a certain groove depth in Japanese Patent No. 4275856 (Patent Document 2).

SUMMARY

An insert of the present disclosure may include a first surface, a second surface connecting to the first surface, and a cutting edge located on at least a part of a ridgeline between the first surface and the second surface. The first surface may include, at a position away from the ridgeline, a groove extending from a first end part closest to the cutting edge to a second end part farthest away from the cutting edge. The groove may include an opening located in the first surface, and a bottom surface. A distance from the bottom surface to the opening may be a groove depth, and a length of the groove in an extending direction of the groove may be a groove length, the groove may include, at a position closer to the first end part than a half of the groove length, a first groove part where the groove depth increases as going from the second end part toward the first end part, and a second groove part where the groove depth decreases as going from the second end part toward the first end part. The first groove part may be located closer to the second end part than the second groove part.

A cutting tool of the present disclosure may include a holder, which has a length extending from a first end to a second end and includes a pocket located on a side of the first end, and the insert located in the pocket.

EMBODIMENTS

Figure 1:
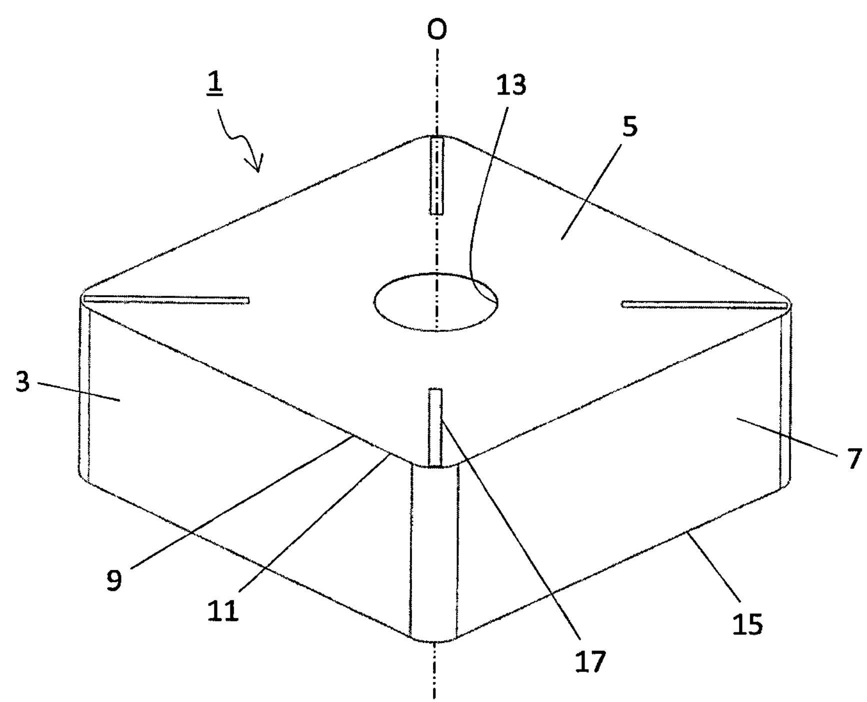
FIG. 1 is a perspective view illustrating an embodiment of inserts in the present disclosure.
Figure 2:
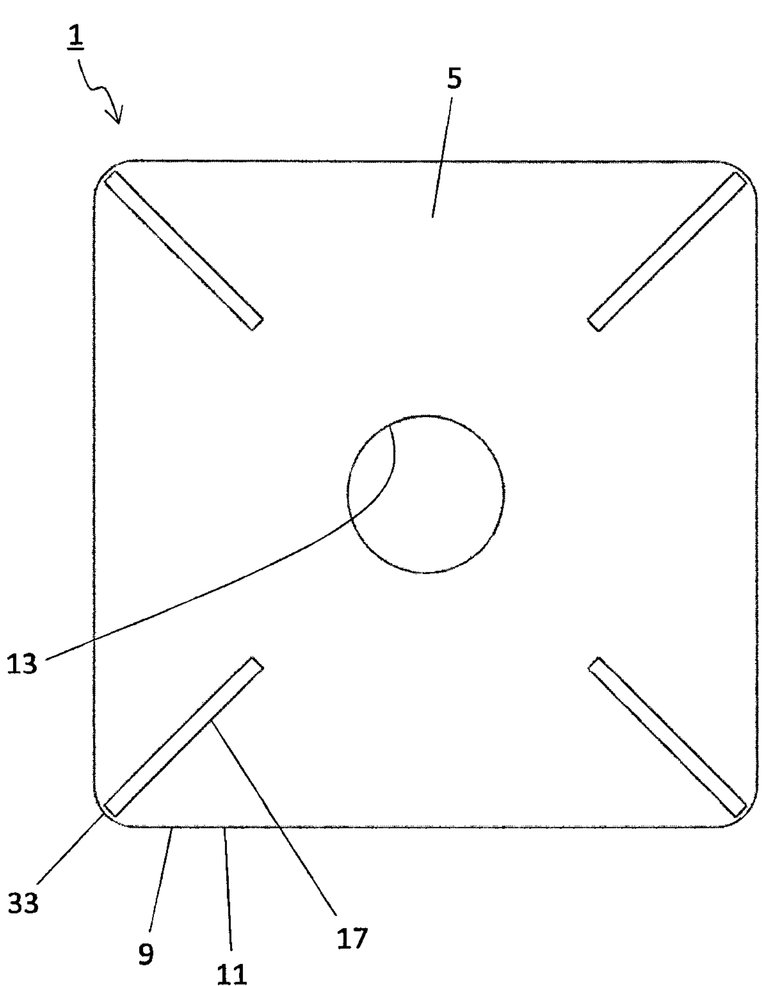
FIG. 2 is a plan view of the insert illustrated in FIG. 1.
Figure 3:
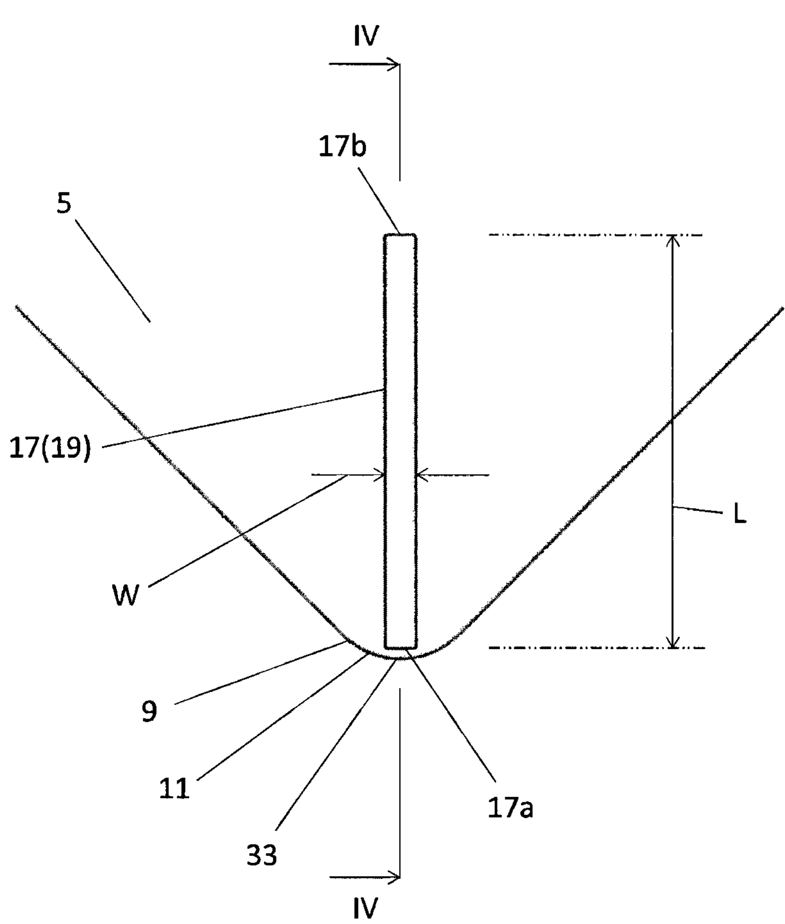
FIG. 3 is an enlarged view of a neighborhood of a corner part in the insert illustrated in FIG. 2.

A related art insert may have failed to offer cooling effect of sufficiently contributing to higher cutting speeds.

The present disclosure may provide an insert and a cutting tool which are capable of offering the cooling effect of sufficiently contributing to higher cutting speeds.

<Inserts>

Inserts in the present disclosure may be described in detail below with reference to the drawings. For the sake of description, the drawings referred to below may illustrate, in simplified form, only main members necessary for describing embodiments. Hence, the inserts may include any arbitrary structural member not illustrated in the drawings referred to. Dimensions of the members in each of the drawings may faithfully represent neither dimensions of actual structural members nor dimensional ratios of these members.

The insert 1 illustrated in FIGS. 1 to 5 may be an embodiment of indexable cutting inserts used by being attached to a predetermined position at a front end of a holder. The insert 1 may be rephrased as the cutting insert 1.

The insert 1 may include a base 3 composed of cemented carbide, cermet, or the like. The insert 1 may include the base 3 composed of a so-called cemented carbide including WC, and Co, Ni and Fe, each being a binding phase. The use of the base 3 may lead to excellent welding resistance against metal including Ti.

As used here, "WC" may denote WC particles. The WC particles may have, for example, a mean particle diameter of 0.5-1.5 μm. The base 3 may include 4-12 mass % of the binding phase. The base 3 may include only WC as a rest, besides the binding phase. The base 3 may include a hard phase including WC, and a binding phase including Co. In the present disclosure, a range, such as 4-12 mass %, may denote being a lower limit value or more and an upper limit value or less.

The insert 1 may have a polygonal plate shape, and may include a first surface 5 and a second surface 7 connecting to the first surface 5. If the first surface 5 is viewed from above, the insert 1 may have a quadrangular shape. The insert 1 may also include a cutting edge 11 located on at least a part of a ridgeline 9 between the first surface 5 and the second surface 7. The first surface 5 may correspond to a rake surface 5, and the second surface 7 may correspond to a flank surface 7 in the non-limiting embodiment illustrated in FIG. 1. These may also be true for the following drawings. The first surface 5 may include a through hole 13 vertically penetrating the insert 1 in order to fix the insert 1 to the holder described later. The cutting edge 11 may be located on at least a part of the ridgeline 9 in the insert 1. Specifically, the cutting edge 11 may be located on portions corresponding to two sides, or may be located in a ring shape on the whole of an outer peripheral part of the first surface 5.

The insert 1 may include a third surface 15 located on a side opposite to the first surface 5. In general, the first surface 5 may be called "an upper surface," the second surface 7 may be called "a lateral surface," and the third surface 15 may be called "a lower surface."

Dimensions of the insert 1 may not be particularly limited. For example, a length of one side of the first surface 5 may be set to approximately 5-20 mm, and a height from the first surface 5 to the third surface 15 may be set to approximately 3-20 mm.

The first surface 5 may include a groove 17. The groove 17 may be servable as a flow path for a coolant. There may be one or a plurality of grooves 17.

The groove 17 may extend from a first end part 17*a* closest to the cutting edge 11 toward a second end part 17*b* farthest away from the cutting edge 11, at a position away from the ridgeline 9. With this configuration, the groove 17 may not connect to the ridgeline 9, and the cutting edge 11 may therefore be excellent in fracture resistance.

The groove 17 may be separated from the ridgeline 9 in a range of 40-700 μm away from the ridgeline 9. In other words, a distance between the groove 17 and the ridgeline 9 may be 40-700 μm. If the distance between the groove 17 and the ridgeline 9 is 40 μm or more, the cutting edge 11 may be less prone to fracture. If the distance between the groove 17 and the ridgeline 9 is 700 μm or less, the cooling effect of the cutting edge 11 may be enhanced, and it may be easy to reduce cutting force.

The distance between the groove 17 and the ridgeline 9 may be 50-120 μm. With this configuration, the cutting edge 11 of the insert 1 may be less prone to fracture, and cutting force may be low. The distance between the groove 17 and the ridgeline 9 may be obtained by measuring the shortest distance between the groove 17 and the ridgeline 9.

The groove 17 may include an opening 19 located in the first surface 5, and a bottom surface 21. A distance from the bottom surface 21 to the opening 19 may be a groove depth D. The groove depth D may be defined as follows. Firstly, an imaginary straight line passing through a center of the first surface 5 and a center of the third surface 15 may be a central axis O of the insert 1. Then, an imaginary plane that is orthogonal to the central axis O and is located between the first surface 5 and the third surface 15 may be a reference plane S. A dimension between the bottom surface 21 and the opening 19 on an imaginary straight line L1 orthogonal to the reference plane S may be the groove depth D.

A length of the groove 17 in an extending direction of the groove 17 may be a groove length L. The groove 17 may include a first groove part 23 and a second groove part 25 at a position closer to the first end part 17*a* than a half (midpoint) of the groove length L. The first groove part 23 may have a larger groove depth D as going from the second end part 17*b* toward the first end part 17*a*. The second groove part 25 may have a smaller groove depth D as going from the second end part 17*b* toward the first end part 17*a*. The first groove part 23 may be located closer to the second end part 17*b* than the second groove part 25.

With this configuration, if a coolant is supplied to the cutting edge 11, the groove 17 may serve as a flow path for the coolant, and the coolant may be allowed to flow in the vicinity of the cutting edge in the order of the first groove part 23 and the second groove part 25. The groove 17 in the vicinity of the cutting edge can be made deeper by the first groove part 23 and the second groove part 25, and the depth of the groove 17 can be changed in the vicinity of the cutting edge. Increasing the depth of the groove 17 in the vicinity of the cutting edge may lead to an increase in contact area with the coolant, thereby enhancing the cooling effect in the vicinity of the cutting edge. Additionally, the change in the depth of the groove 17 in the vicinity of the cutting edge can generate a turbulent flow of the coolant so as to enhance heat exchange efficiency. The insert 1 may therefore be excellent in cooling properties and may be capable of achieving a high-speed machining.

If a workpiece, such as a titanium material and steel, is subjected to a high-speed machining, heat may tend to stay in the cutting edge, and crater wear may tend to proceed. If the crater wear proceeds, a crater wear portion may serve as a starting point, and the insert 1 may become prone to fracture. With the above configuration, the cooling effect in the vicinity of the cutting edge can be enhanced to reduce the crater wear, thereby reducing occurrence of the fracture and chipping of the insert 1.

Figure 4:
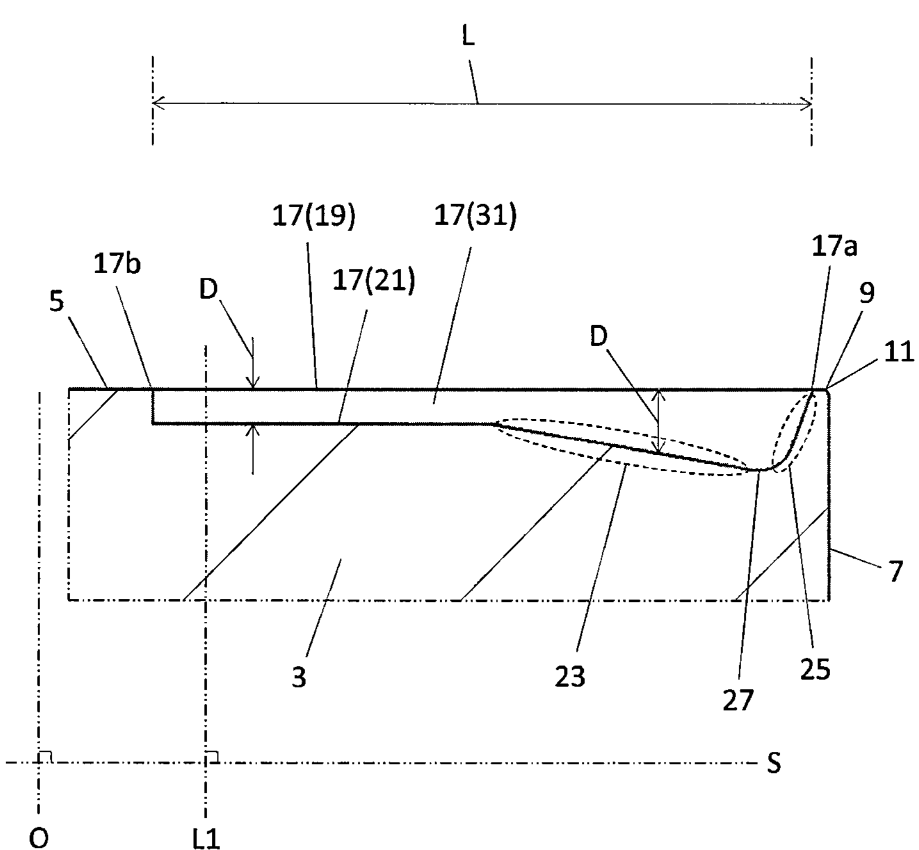
FIG. 4 is a sectional view taken along line IV-IV in the insert illustrated in FIG. 3.
Figure 5:
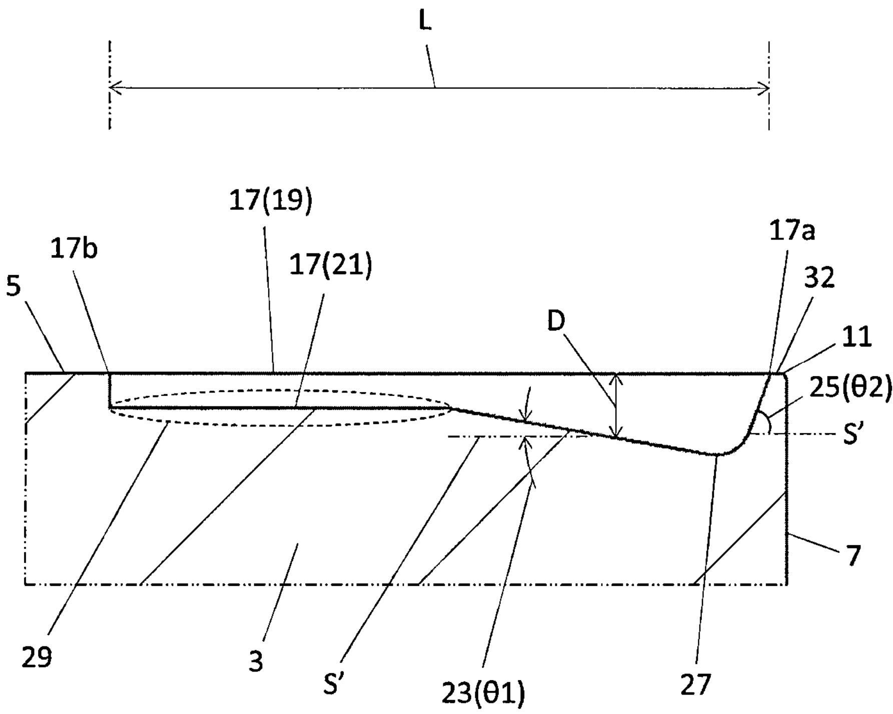
FIG. 5 is a sectional view identical to FIG. 4.
Figure 6:
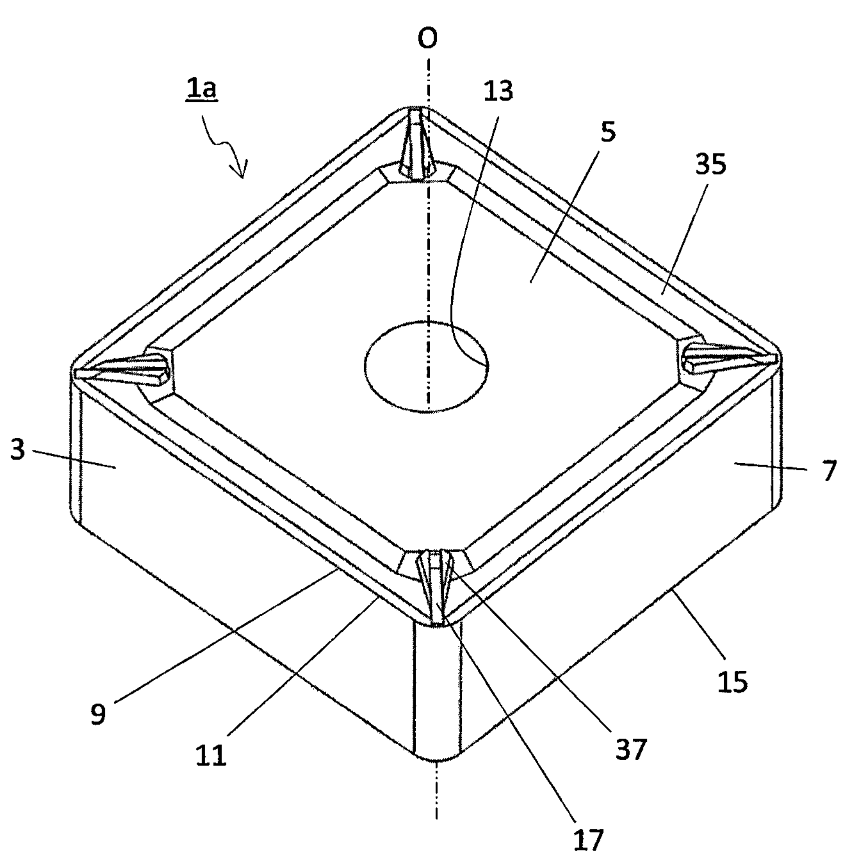
FIG. 6 is a perspective view illustrating an embodiment of inserts in the present disclosure.
Figure 7:
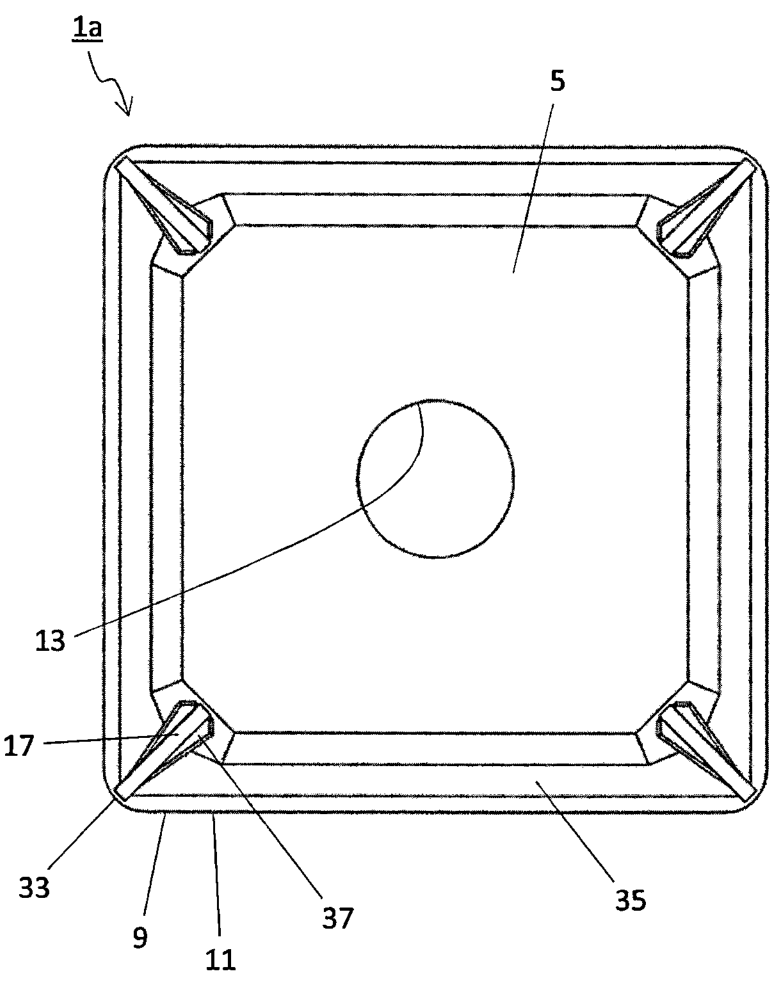
FIG. 7 is a plan view of the insert illustrated in FIG. 6.
Figure 8:
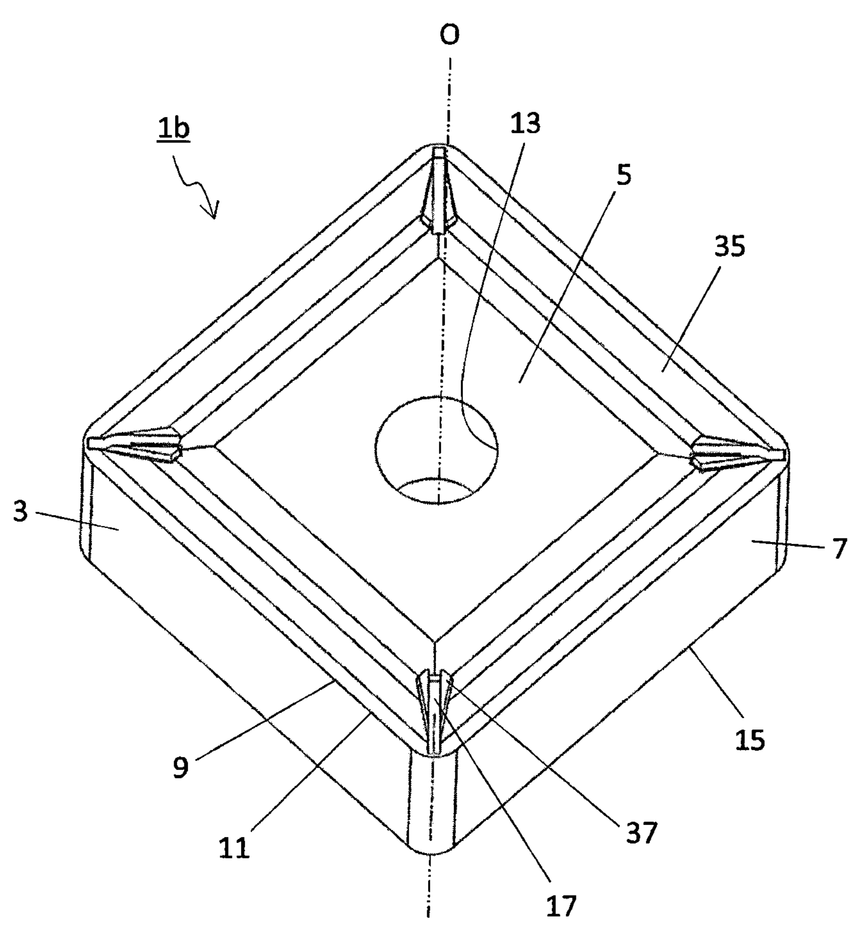
FIG. 8 is a perspective view illustrating an embodiment of inserts in the present disclosure.
Figure 9:
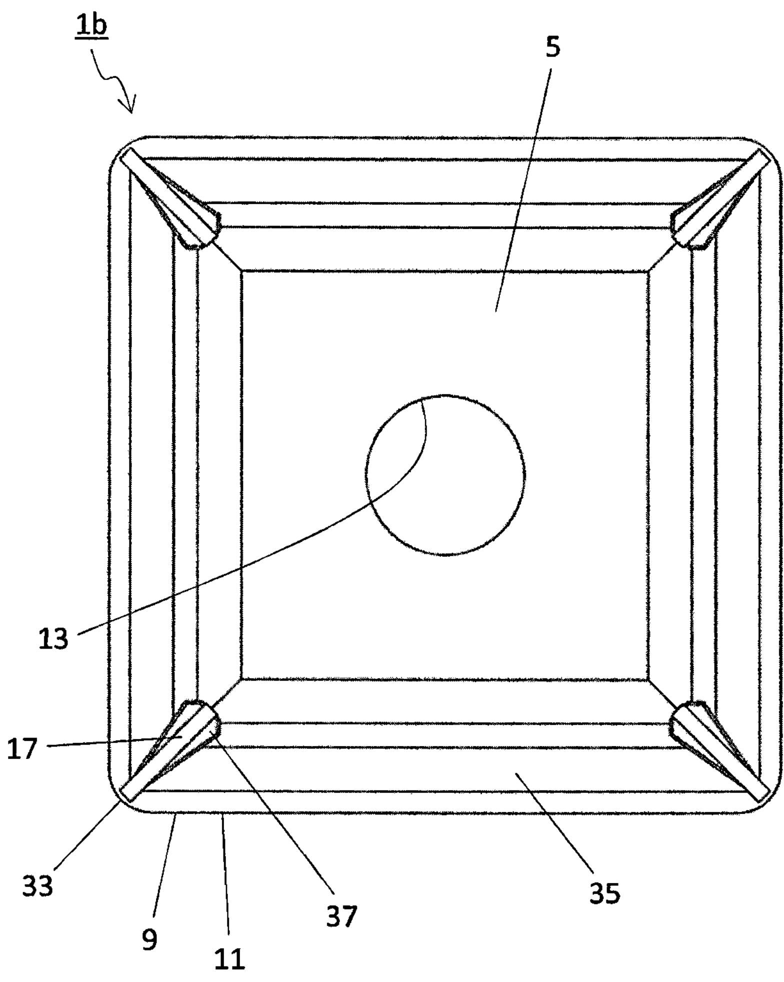
FIG. 9 is a plan view of the insert illustrated in FIG. 8.
Figure 10:
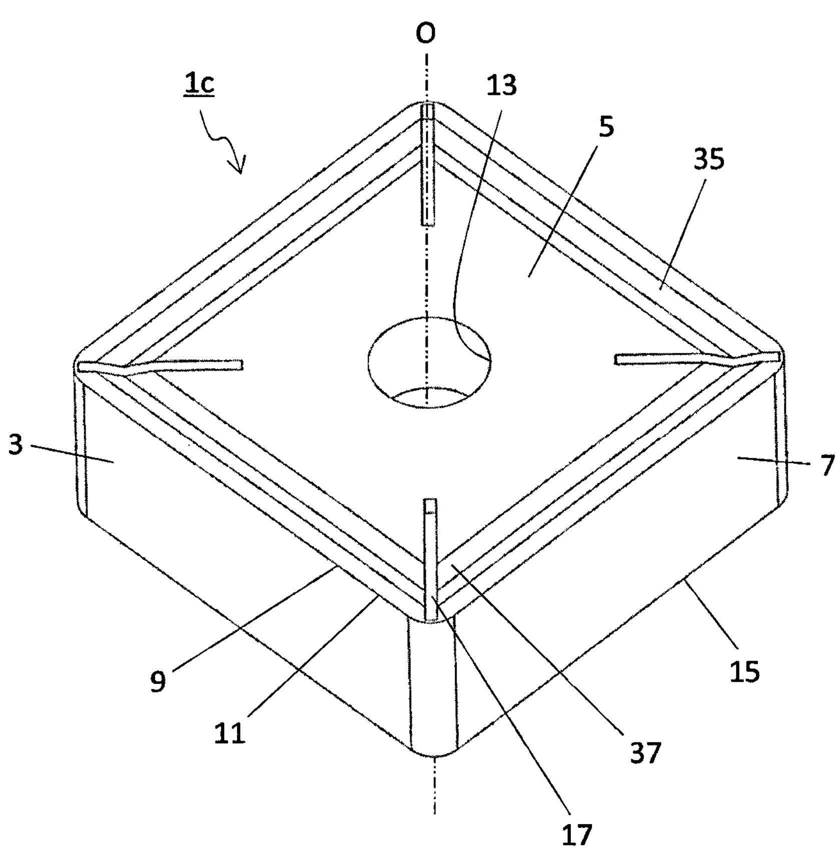
FIG. 10 is a perspective view illustrating an embodiment of inserts in the present disclosure.
Figure 11:
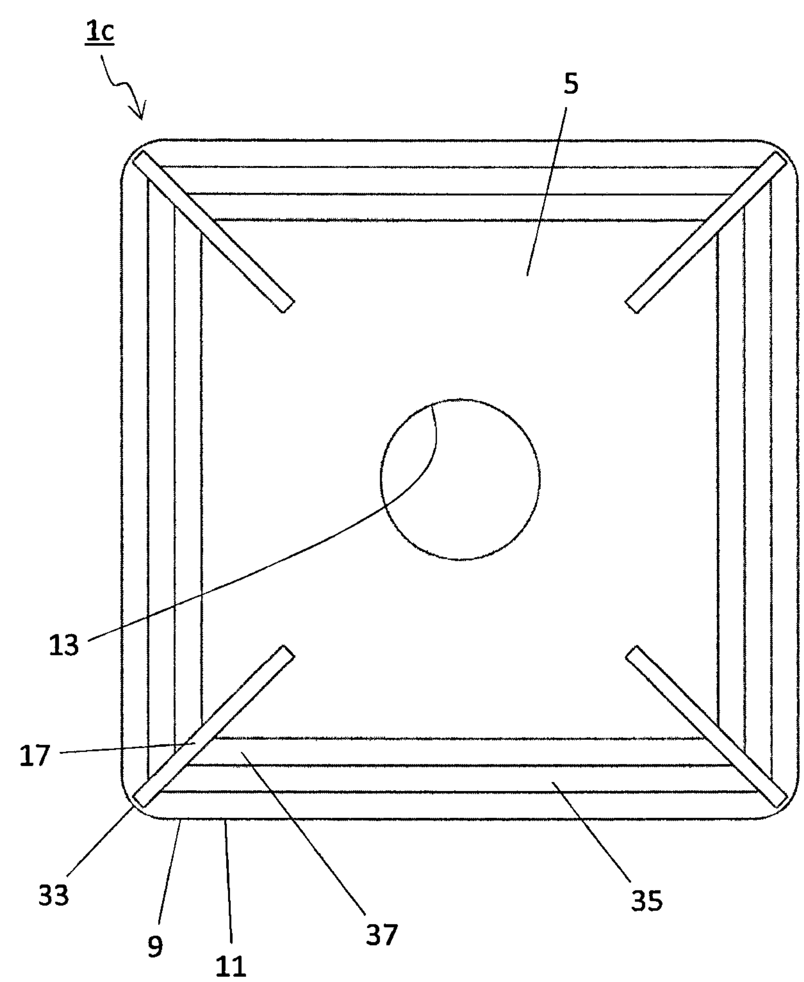
FIG. 11 is a plan view of the insert illustrated in FIG. 10.

FIG. 4 may illustrate an embodiment where the first surface 5 is flat, and the opening 19 is also located on the first surface 5 that is flat. The first surface 5 may be located higher on a side of the cutting edge 11.

If a workpiece is Ti-6Al-4V as an embodiment of machining conditions, it is possible to set that a cutting speed (Vc) is 60-100 m/min, a feed speed (f) is 0.05-0.3 mm/rev, and a cut depth (ap) is 0.2-2.0 mm. As a specific embodiment, it is possible to set that Vc is 80 m/min, f is 0.1 mm/rev, and ap is 0.5 mm. It is also possible to set that Vc is 100 m/min, f is 0.15 mm/rev, and ap is 0.5 mm. If a workpiece is SCM435, it is possible to set that Vc is 250 m/min, f is 0.3 mm/rev, and ap is 2.0 mm.

The groove depth D and the groove length L may not be limited to a specific value. For example, the groove depth D may be set to approximately 40-700 μm. The groove length L may be set to approximately 40-5000 μm.

The second groove part 25 may be present in a range from the first end part 17*a* to one-fifth of the groove length L. This configuration may contribute to further enhancement of cooling effect in the vicinity of a ridgeline of the cutting edge. The first groove part 23 may be present in a range from the first end part 17*a* to less than a half of the groove length L.

A part 27 having the largest groove depth D in the groove 17 may be present in a range from the first end part 17*a* to less than a half of the groove length L. With this configuration, even in situations where a crater wear occurs in a rake surface of a tool, cooling effect of a deepest portion of the crater wear that is a chip contact portion can be facilitated because the groove is formed deeper than craters. The part 27 having the largest groove depth D in the groove 17 may be present in a range from the first end part 17*a* to one-third of the groove length L.

The part 27 having the largest groove depth D in the groove 17 may be located between the first groove part 23 and the second groove part 25. The part 27 having the largest groove depth D in the groove 17 may be a part of the groove 17 where the bottom surface 21 is located closest to the reference plane S. The part 27 having the largest groove depth D in the groove 17 may be rephrased as a deepest groove part 27.

The groove 17 may include a roundness whose radius R is 20-500 μm from the part 27 having the largest groove depth D in the groove 17 to the second groove part 25. With this configuration, the flow of the coolant may be less likely to be blocked. By a combination of this configuration and a high-pressure coolant, chip push-up effect by the coolant can be enhanced to finely divide chips. The second groove part 25 may connect to the deepest groove part 27 with the roundness whose radius R is 20-500 μm interposed therebetween. The first groove part 23 may directly connect to the deepest groove part 27.

A width of the opening 19 in a direction orthogonal to the extending direction of the groove 17 may be an opening width W. A ratio of the groove depth D and the opening width W (groove depth D/opening width W) may be 0.5 or more at the part 27 having the largest groove depth D in the groove 17. With this configuration, the chips may be less likely to enter the groove 17, and the function as the flow path for the coolant in the groove 17 can easily be maintained at the deepest groove part 27.

An upper limit value of the ratio (groove depth D/opening width W) may be 3. With this configuration, a flow rate of the coolant may be less likely to decrease at the deepest groove part 27. It may therefore be easy to maintain the cooling effect. The opening width W may be set to approximately 40-700 μm.

A groove length of the first groove part 23 may be larger than a groove length of the second groove part 25. With this configuration, the groove length of the first groove part 23 may be relatively long. Hence, the groove 17 in the vicinity of the cutting edge can be made deep, and the depth of the groove 17 in the vicinity of the cutting edge can be changed. It may therefore be easy to enhance the cooling effect in the vicinity of the cutting edge.

The bottom surface 21 in the first groove part 23 and the second groove part 25 may be inclined relative to the reference plane S. That is, the bottom surface 21 of the first groove part 23 may be inclined so as to come closer to the reference plane S as going toward the first end part 17*a*. The bottom surface 21 of the second groove part 25 may be inclined so as to separate from the reference plane S as going toward the first end part 17*a*.

An inclination angle θ1 of the bottom surface 21 of the first groove part 23 relative to the reference plane S may be smaller than an inclination angle θ2 of the bottom surface 21 of the second groove part 25 relative to the reference plane S. With this configuration, the coolant may tend to be discharged vigorously from the groove 17.

The inclination angles θ1 and θ2 of the bottom surface of 21 of the first groove part 23 and the second groove part 25 respectively are not limited to a specific value. For example, the inclination angle θ1 of the bottom surface 21 of the first groove part 23 may be set to 5-30°. The inclination angle θ2 of the bottom surface 21 of the second groove part 25 may be set to 30-85°. Evaluations of the inclination angles θ1 and θ2 may be made on the basis of an imaginary plane S' parallel to the reference plane S.

The groove 17 may include a region 29 which is located closer to the second end part 17*b* than the first groove part 23 and in which the bottom surface 21 is parallel to the reference plane S. The first groove part 23 may connect to the region 29. The groove 17 may include an end surface connecting an end portion on a side of the second end part 17*b* in the region 29, and the second end part 17*b*. The end surface may be parallel to the central axis O. The second end part 17*b* is not limited to the above structure connectable to the end surface. The second end part 17*b* may be opened by being communicated with a space, such as a concave part.

The groove 17 may include a sidewall surface 31 extending from the bottom surface 21 to the opening 19. A surface roughness of the sidewall surface 31 may be R1, and a surface roughness of the bottom surface 21 may be R2. R1 may be Ra 3.0 μm or less, and R1>R2. With this configuration, a surface area on a side of the sidewall surface 31 may be increased to enhance the cooling effect, and turbulence may tend to occur due to different roughnesses.

A lower limit value of R1 may be Ra 0.5 μm. R2 may be set to approximately Ra 0.2-2.5 μm. The surface roughness may be evaluated by, for example, arithmetic average roughness (Ra). The arithmetic average roughness (Ra) may be measured according to, for example, JIS B 0601-2013.

The first surface 5 may include a land surface 32 which is located closer to the cutting edge 11 than the second groove part 25, and which is inclined relative to the second groove part 25. The first end part 17*a* may be located on a boundary between the second groove part 25 and the land surface 32. The first end part 17*a* may include a roundness. If the first end part 17*a*, which corresponds to a ridgeline between the second groove part 25 and the land surface 32 inclined relative to the second groove part 25, include the roundness, the coolant may tend to be discharged smoothly from the groove 17 to the cutting edge.

The roundness of the first end part 17*a* may be 20-100 μm in radius R. With this configuration, the flow of the coolant can be made smooth, and a stress concentration during outflow of chips can be relaxed to reduce chipping and fracture.

The first surface 5 may include a corner part 33. The groove 17 may extend along a bisector of the corner part 33. The groove 17 may be located on the bisector of the corner part 33.

For example, a coating layer including a TiCN layer and an $Al_2O_3$ layer may be disposed on a surface of the base 3 in the insert 1. The base 3 may be exposed on at least a region in the vicinity of the cutting edge 11 and the groove 17 on the first surface 5 in the insert 1. In other words, the coating layer need not be present on the surface of the base 3 in the vicinity of the cutting edge 11 and the groove 17 on the rake surface 5.

With this configuration, it is possible to avoid a workpiece from being welded to the insert 1 even in the case of machining metal including, for example, titanium having high weldability. The above-mentioned region may be a region located within 0.5 mm from the cutting edge 11 and the groove 17. That is, the base 3 may be exposed in a region of the first surface 5 which falls within the range located within 0.5 mm from the cutting edge 11 and the groove 17 in the insert 1. The coating layer need not be present on the entire surface of the base 3.

A shape of the groove 17 (hereinafter also referred to as a cross-sectional shape of the groove 17) in a cross section orthogonal to the extending direction of the groove 17 may be a shape whose opening width W is larger than a width of the bottom surface 21. The cross-sectional shape of the groove 17 may be, for example, a semicircular shape, a triangular shape, or a trapezoidal shape.

The insert 1 including the groove 17 on the rake surface 5 may be obtained, for example, by manufacturing cemented carbide in the shape of the insert without the groove 17, and then by forming the groove 17 on the rake surface 5 so as to serve as the groove 17 in the insert 1 by using, for example, a drilling process or laser beam. The insert 1 is also obtainable by manufacturing a molded body with a concave part serving as the groove 17 after sintering, by using a mold with a convex part corresponding to the groove 17, followed by sintering the molded body.

The shape of the groove 17 is measurable with, for example, a shape analysis laser microscope. The shape may be measured with, for example, a VK-X1000 manufactured by KEYENCE CORPORATION. Measurement conditions may be the following conditions.

Measurement mode: Simple measurement
Scanning mode: Focus variation
Measurement size: Standard
Pitch: 4.50 μm
Brightness: 70
To enable noise region processing: ON
Coaxial vertical: 100
Ring illumination: OFF
Z-axis mode: Recommended setting
Z measurement distance fixing: OFF
Automatic upper and lower limits: ON
Head: R
Objective lens name: Plan
Objective lens magnification: 10×
NA: 0.3
WD: 16.5 mm
Brightness mode: Automatic
Brightness (automatic): 70
Brightness (manual): 2
Edge enhancement: 5

Next, inserts 1*a* to 1*c* of the present disclosure may be described below with reference to FIGS. 6 to 11. The following description of the inserts 1*a* to 1*c* may be focused mainly on differences from the insert 1, and a detailed description of configurations similar to those of the insert 1 may be omitted in some cases.

The inserts 1*a* to 1*c* may include a breaker groove 35 located on the first surface 5 along the cutting edge 11 as in a non-limiting embodiment illustrated in FIGS. 6 to 11. The breaker groove 35 may come closer to the reference plane S as going away from the cutting edge 11.

The inserts 1*a* to 1*c* may include a convex part 37 located more inside the first surface 5 than the cutting edge 11. The convex part 37 is capable of controlling a flow direction of chips generated by the cutting edge 11. The convex part 37 is also capable of offering chip dividing effect. The convex part 37 may also be called a breaker protrusion. At least a part of the convex part 37 may be located more inside the first surface 5 than the breaker groove 35. The convex part 37 may extend along the bisector of the corner part 33. The groove 17 may be located so as to overlap with the convex part 37.

<Cutting Tools>

Cutting tools of the present disclosure may be described below with reference to the drawings.

The cutting tool 101 may include a holder 105 which has a length from a first end 105*a* (an upper end in FIG. 12) to a second end 105*b* (a lower end in FIG. 12), and which includes a pocket 103 located on a side of the first end 105*a*, and the above-mentioned insert 1 located in the pocket 103. If the cutting tool 101 includes the insert 1, the cutting tool 101 may have excellent cooling properties and is therefore capable of achieving a high-speed machining, thus leading to a stable machining process for a long term. The groove 17 and the like may be omitted in FIG. 12, and FIG. 12 may illustrate the case where the first surface 5 has a rhombus shape in a plan view. These points may also be true for FIG. 13 described later.

The holder 105 may have a bar shape extending from the first end 105*a* to the second end 105*b*. In general, the first end 105*a* may be called "a front end", and the second end 105*b* may be called "a rear end." A length from the first end 105*a* to the second end 105*b* is not limited to a specific value. For example, the length from the first end 105*a* to the second end 105*b* may be set to approximately 100-250 mm.

The pocket 103 may be a part to which the insert 1 is attached. The pocket 103 may include a seating surface parallel to a lower surface of the holder 105, and a constraining lateral surface vertical or inclined relative to the seating surface. The pocket 103 may open on a side of the first end 105*a* of the holder 105.

The insert 1 may be located in the pocket 103. The lower surface of the insert 1 may be directly in contact with the pocket 103. Alternatively, a sheet may be held between the insert 1 and the pocket 103.

The insert 1 may be attached to the holder 105 so that at least a part of a region used as the cutting edge 11 on the ridgeline 9 where the first surface 5 being the rake surface 5 intersects with the second surface 7 being the flank surface 7 can protrude outward from the holder 105. The insert 1 may be attached to the holder 105 by a screw 107. Specifically, the insert 1 may be attached to the holder 105 by inserting the screw 107 into a through hole 13 of the insert 1, and by inserting a front end of the screw 107 into a screw hole formed in the pocket 103 so as to engage screw parts each other.

The cutting tool 101 may include a hose whose front end includes a nozzle in order to supply a coolant to the cutting edge 11. A pump for supplying the coolant may connect to the hose.

Figure 13:
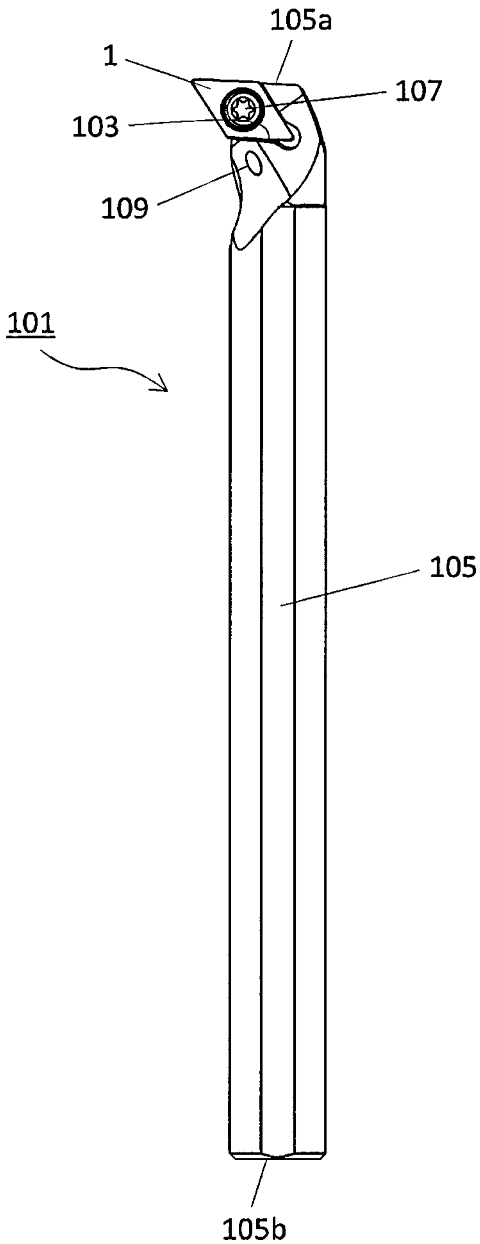
FIG. 13 is a plan view illustrating an embodiment of cutting tools in the present disclosure.

The holder 105 may include a nozzle 109 for supplying the coolant to the cutting edge 11 in the cutting tool 101 as in the non-limiting embodiment illustrated in FIG. 13. A spout of the nozzle 109 located near the insert 1 may facilitate the supply of the coolant to the cutting edge 11. The nozzle 109 may be fixed to a part of the holder 105. Alternatively, the holder 105 may include a hole so as to be used as the nozzle 109 as in the non-limiting embodiment illustrated in FIG. 13. The coolant discharged from the nozzle 109 may be, for example, an aqueous coolant or oil-based coolant.

The nozzle 109 may connect to a pump, and may discharge the coolant at a pressure of 0.5-20 MPa. A higher-speed machining is achievable at a pressure of 10 MPa or more.

The holder 105 may include a flow path through which the coolant flows. For example, steel and cast iron are usable as a material of the holder 105. Of these materials, steel having enhanced toughness may be used.

Figure 12:
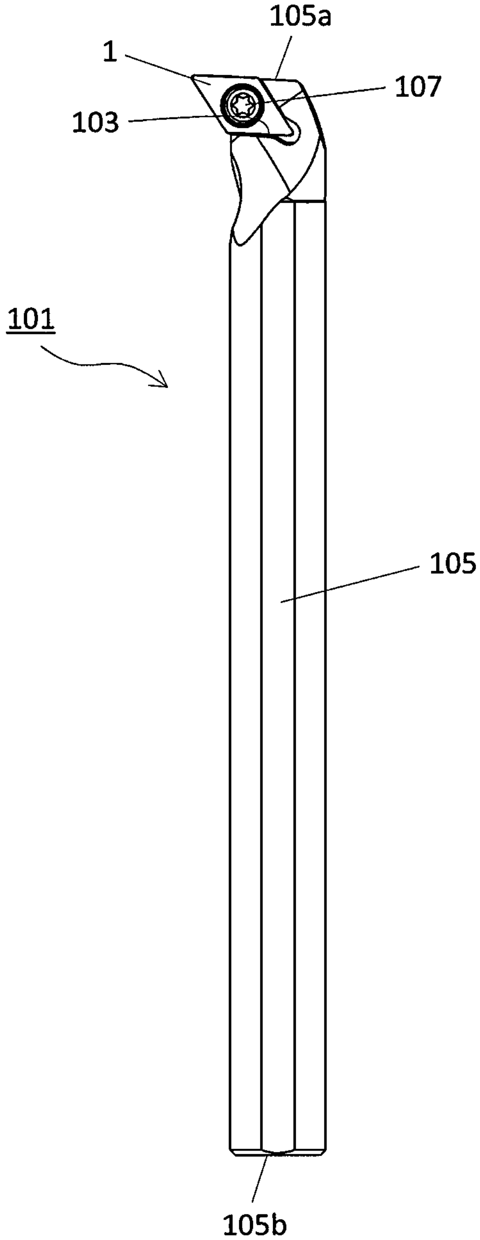
FIG. 12 is a plan view illustrating an embodiment of cutting tools in the present disclosure.

The cutting tool 101 for use in a so-called turning process may be illustrated in the non-limiting embodiments illustrated in FIGS. 12 and 13. Examples of the turning process may include internal process, external process and grooving process. The cutting tool is not limited to ones which are used for the turning process. For example, the insert 1 may be applied to a cutting tool used for a milling process.

Although the cutting tool 101 includes the insert 1 in the non-limiting embodiments illustrated in FIGS. 12 and 13, it is not intended to limit to these embodiments. For example, the cutting tool 101 may include any one of the inserts 1*a* to 1*c*.

The inserts and the cutting tools using the inserts are not limited to the above embodiments, and various improvements and changes may be made without departing from the gist of the present disclosure.

The invention claimed is:

1. An insert, comprising:

a first surface, a second surface connecting to the first surface, and a cutting edge located on at least a part of a ridgeline between the first surface and the second surface, wherein the first surface comprises, at a position away from the ridgeline, a groove elongated, in an extending direction of the groove, from a first end part closest to the cutting edge to a second end part farthest away from the cutting edge, the groove comprises an opening located in the first surface, and a bottom surface, a distance from the bottom surface to the opening is a groove depth, and a length of the groove in the extending direction of the groove is a groove length, the groove comprises, at a position closer to the first end part than a half of the groove length, a first groove part where the groove depth increases going from the second end part toward the first end part, and a second groove part where the groove depth decreases going from the second end part toward the first end part, and the first groove part is located closer to the second end part than the second groove part.

2. The insert according to claim 1, wherein the second groove part is located in a range from the first end part to one-fifth of the groove length.

3. The insert according to claim 1, wherein a part of the groove where the groove depth reaches a maximum is located in a range from the first end part to less than a half of the groove length.

4. The insert according to claim 1, wherein, a width of the opening in a direction orthogonal to the extending direction of the groove is an opening width, and a ratio of the groove depth to the opening width is 0.5 or more at a part of the groove where the groove depth reaches a maximum.

5. The insert according to claim 1, wherein a groove length of the first groove part is larger than a groove length of the second groove part.

6. The insert according to claim 1, wherein the first surface comprises a land surface which is located closer to the cutting edge than the second groove part, and which is inclined relative to the second groove part, the first end part is located on a boundary between the second groove part and the land surface, and the first end part comprises a roundness.

7. The insert according to claim 6, wherein the roundness of the first end part has a radius R in a range of 20-100 μm.

8. The insert according to claim 1, wherein the groove further comprises a region located closer to the second end part than the first groove part, and the groove depth of the region is constant.

9. A cutting tool, comprising:

a holder which has a length extending from a first end to a second end, and which comprises a pocket located on a side of the first end; and an insert located in the pocket, the insert comprising:

a first surface, a second surface connecting to the first surface, and a cutting edge located on at least a part of a ridgeline between the first surface and the second surface, wherein the first surface comprises, at a position away from the ridgeline, a groove elongated, in an extending direction of the groove, from a first end part closest to the cutting edge to a second end part farthest away from the cutting edge, the groove comprises an opening located in the first surface, and a bottom surface, a distance from the bottom surface to the opening is a groove depth, and a length of the groove in the extending direction of the groove is a groove length, the groove comprises, at a position closer to the first end part than a half of the groove length, a first groove part where the groove depth increases going from the second end part toward the first end part, and a second groove part where the groove depth decreases going from the second end part toward the first end part, and the first groove part is located closer to the second end part than the second groove part.

10. The cutting tool according to claim 9, wherein the holder comprises a flow path configured to allow a coolant to flow through.

11. An insert, comprising:

a first surface, a second surface connecting to the first surface, and a cutting edge located at an intersection of the first surface and the second surface, wherein the first surface comprises a groove separated from the cutting edge and having an opening and a bottom surface, the groove is elongated along an extending direction intersecting the cutting edge, the groove comprises a first end part closest to the cutting edge in the extending direction, a second end part farthest away from the cutting edge in the extending direction, a central part located at an intermediate position between the first end part and the second end part, a first groove part located between the first end part and the central part, and a second groove part located between the first end part and the first groove part, a distance from the bottom surface to the opening is a groove depth, the groove depth of the first groove part increases going toward the first end part, and the groove depth of the second groove part decreases going toward the first end part.

12. The insert according to claim 11, wherein the groove further comprises a third groove part between the second end part and the first groove part, and the groove depth of the third groove part is constant.

* * * * *